United States Patent
Chang

(10) Patent No.: US 7,108,460 B2
(45) Date of Patent: Sep. 19, 2006

(54) UNITIZED DRILL BIT

(76) Inventor: Hsin-Tien Chang, No. 21, Lane 85, Yung Feng Road, Taipin City, Taichung Hsien (TW)

( * ) Notice: Subject to any disclaimer, the term of this patent is extended or adjusted under 35 U.S.C. 154(b) by 0 days.

(21) Appl. No.: 10/292,879

(22) Filed: Nov. 13, 2002

(65) Prior Publication Data

US 2004/0091329 A1 May 13, 2004

(51) Int. Cl.
*B23B 51/00* (2006.01)

(52) U.S. Cl. .................. 408/223; 408/225; 408/233; 408/713

(58) Field of Classification Search .......... 408/223, 408/224, 225, 227, 230, 233, 713
See application file for complete search history.

(56) References Cited

U.S. PATENT DOCUMENTS

| 2,400,856 | A | * | 5/1946 | Thompson | 408/233 |
| 4,230,429 | A | * | 10/1980 | Eckle | 408/186 |
| 4,303,358 | A | * | 12/1981 | Grusa | 408/223 |
| 4,676,702 | A | * | 6/1987 | Reinauer | 408/144 |

FOREIGN PATENT DOCUMENTS

| DE | 19710997 | * | 9/1998 |
| JP | 54-40384 | * | 3/1979 |
| JP | 60-67012 | * | 4/1985 |
| JP | 55-144907 | * | 11/1990 |

* cited by examiner

*Primary Examiner*—Daniel W. Howell
(74) *Attorney, Agent, or Firm*—Charles E. Baxley

(57) ABSTRACT

The present invention provides a unitized replaceable drill bit, and more particularly to a cutting tip of the drilling common bit, in which the central drill has an extended cutting edge, thereby to form a continuous cutting with the side cutting edges so as to prevent the cutting edge from chipping by built-up edge, and make the central drill become smoother and tougher, further to improve cutting property, easy manufacturing and efficiently reducing production cost, and improving competition capability in the market, wherein, integrating the central cutting drill and the level extended cutting edge into one whole body is to widen the cutting range, extend the cutting edge, and prevent chip from building up on the cutting edges and the cutting edges from breaking up; and building up a notch without cutting function on the joint portion of the bevel cutting edge of the central cutting drill and the level extended cutting edge separates said two cutting edges segments so that the cutting resistance may not be concentrated on the notch, and efficiently avoid the cutting edges being broken up; a couple of contact surfaces of the central cutting insert and the central cutting insert retain are built up a pair of dovetail fitting to improve the rigidity of the central cutting insert, further to improve cutting efficiency and performance.

4 Claims, 9 Drawing Sheets

UNITIZED DRILL BIT

BACKGROUND OF THE INVENTION

1. Field of the Invention

The present invention relates to a unitized replaceable drilling common bit, and more particularly to a cutting tip of the drilling common bit, in which the central drill has an extended cutting edge, thereby to form a continuous cutting with the side cutting edges so as to prevent the cutting edge from chipping by built-up edge, and make the central drill become smoother and tougher, further to improve cutting property, easy manufacturing and efficiently reducing production cost, and improving competition capability in the market.

2. Description of Prior Art

In accordance with the conventional composite drilling common bit 10, manufactured by the famous provider KENNAMETEL HERTEL Co., as shown on FIG. 8, beside the chisel-edge (static point) 12 of the cutting tip 11 the both cutting edges have several chip-breaker grooves 13 for breaking the chip into smaller pieces, but these chip-breaker grooves 13 make the cutting lips have discontinuous cutting so that the chip may pile up in there, and due to the slow spinning at the chisel-edge 12, the bit may bear relative greater cutting resistance and pressure, therefore the chip may be held up there and the corners of the chip-breaker grooves 13 bear force so big that they are broken up to occur the cutting tip 11 damage so as to unable to be used any more, so this shortcoming will increase the tool cost.

And referring to FIG. 9, an other kind of unitized drilling common bit 20, provided by KENNAMETEL HERTEL Co. too, includes a central drill 21 embedded at the center, an inside cutting insert 22 and an outside cutting insert 23 secured on the bit shank, but in this structure, the gaps between the central drill 21's chisel-edge and the side cutting edges, and the adjacent side cutting inserts—inside and outside cutting inserts 22 and 23 are easy to hole up chip (the portions fingered by arrows a and b) so as to extrude the cutting edges, and additionally spinning in lower speed, the relative cutting resistance is gone up, the cutting edges are easy to be broken, especially to the portion fingered by arrow 1 between the side cutting edge of the central drill 21 and the adjacent inner cutting corner of the inside cutting insert 22, the cutting stress concentrates on this corner so as to break it easily to damage the cutting insert, because the central drill 21 is expensive, so the relative production cost may go up.

OBJECTS AND SUMMARY OF THE INVENTION

It is therefore a main object of the present invention to provide a unitized drill bit, in which the central drill has an extended cutting edge, thereby to form a continuous cutting with the side cutting edges so as to prevent the cutting edge from chipping by built-up edge, and improve the cutting performance.

It is a next object of the present invention to provide a unitized drill bit, which provides a central cutting insert retainer like a single side of dovetail groove for locating and supporting the central cutting insert to improve the capability of bearing cutting pressure and torque.

It is a last object of the present invention to provide a unitized drill bit, in which, by means of a displace between the center points of the screw hole and the blind hole, and cooperating to the touching slopes of said single side of dovetail groove and the contacting side of the central cutting insert, the central cutting insert is fastened more stably as securing the screw.

DETAILED DESCRIPTION OF PREFERRED EMBODIMENTS

Figure 1:
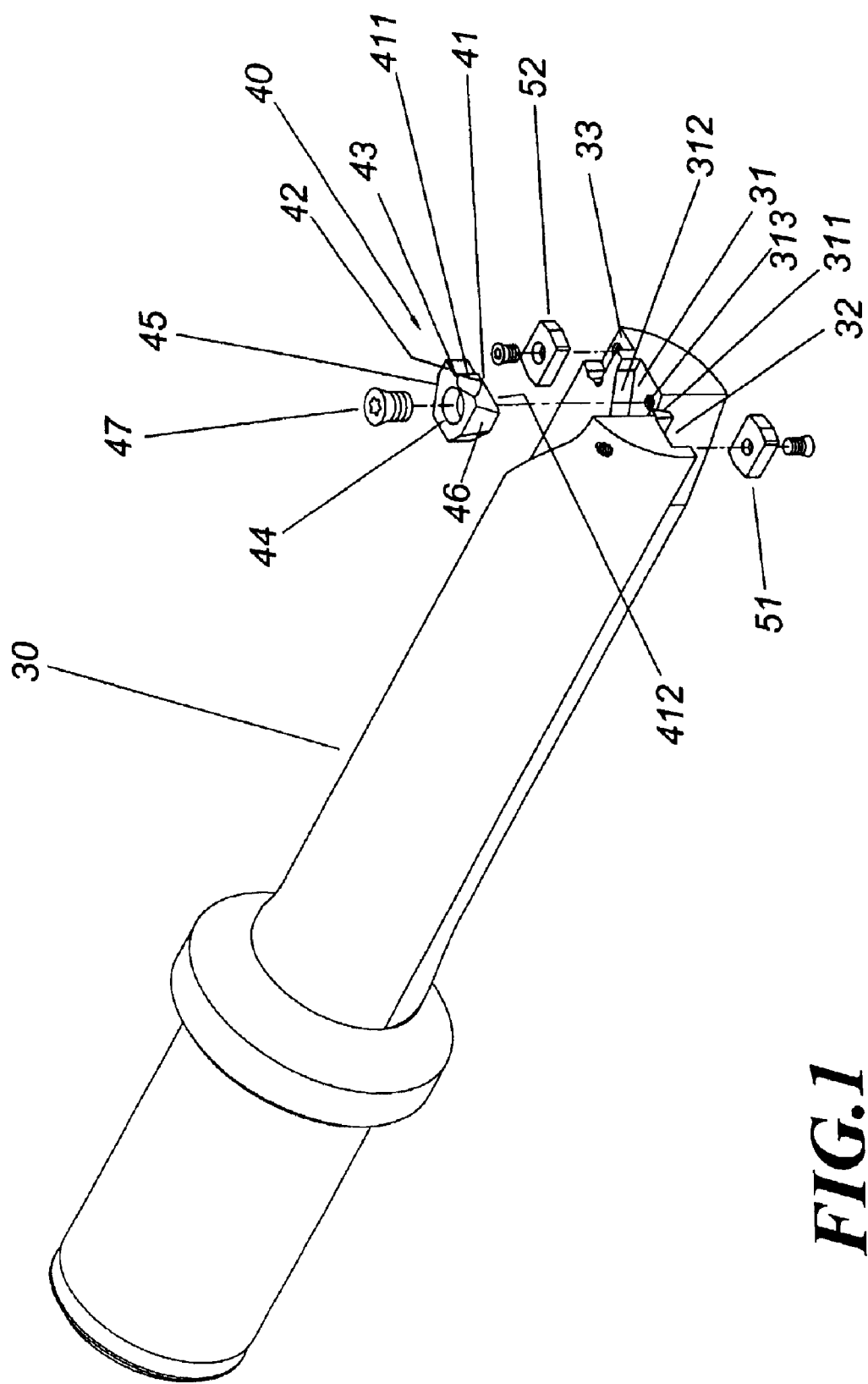
FIG. 1 is a solid view of the present invention.
Figure 2:
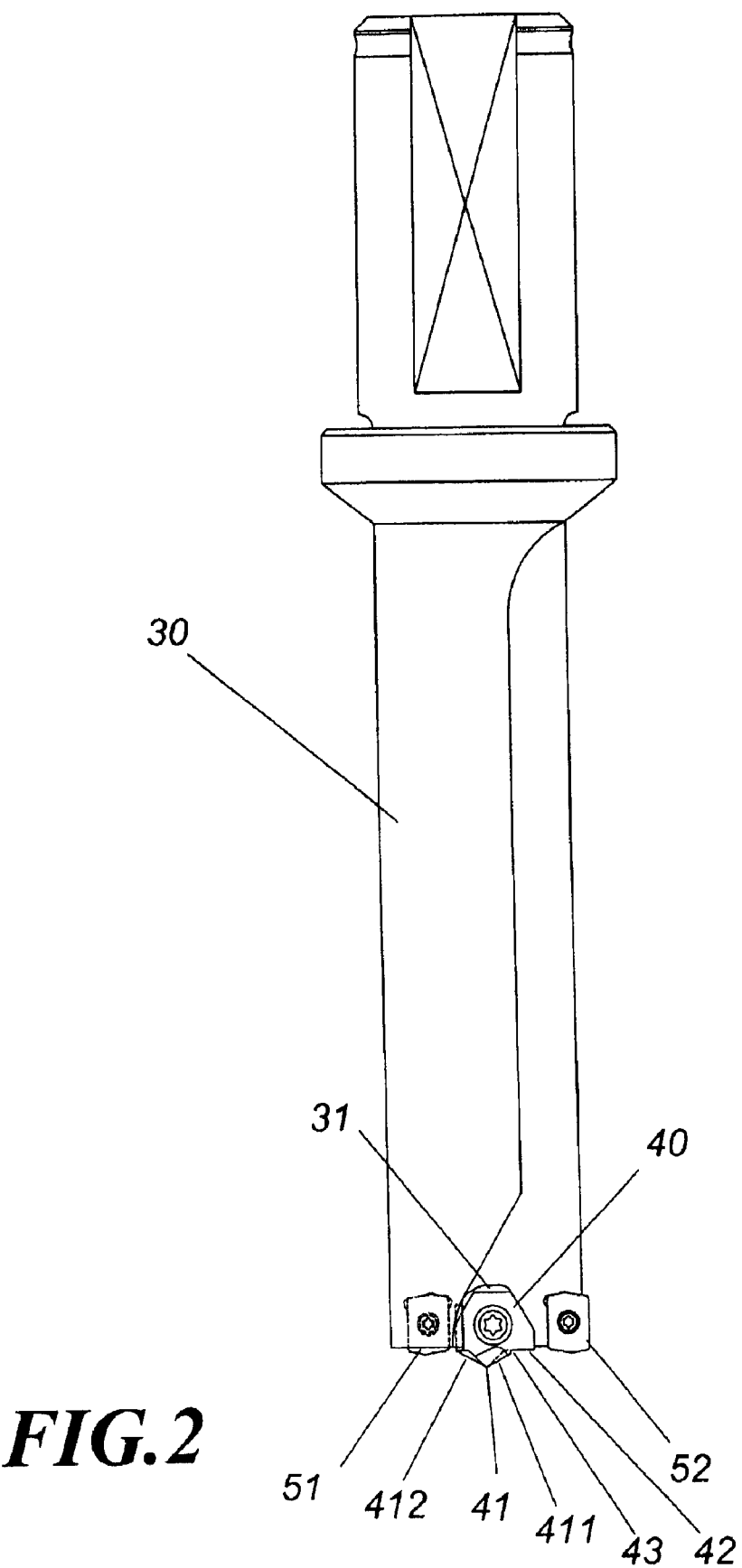
FIG. 2 is a side view of the present invention.
Figure 3:
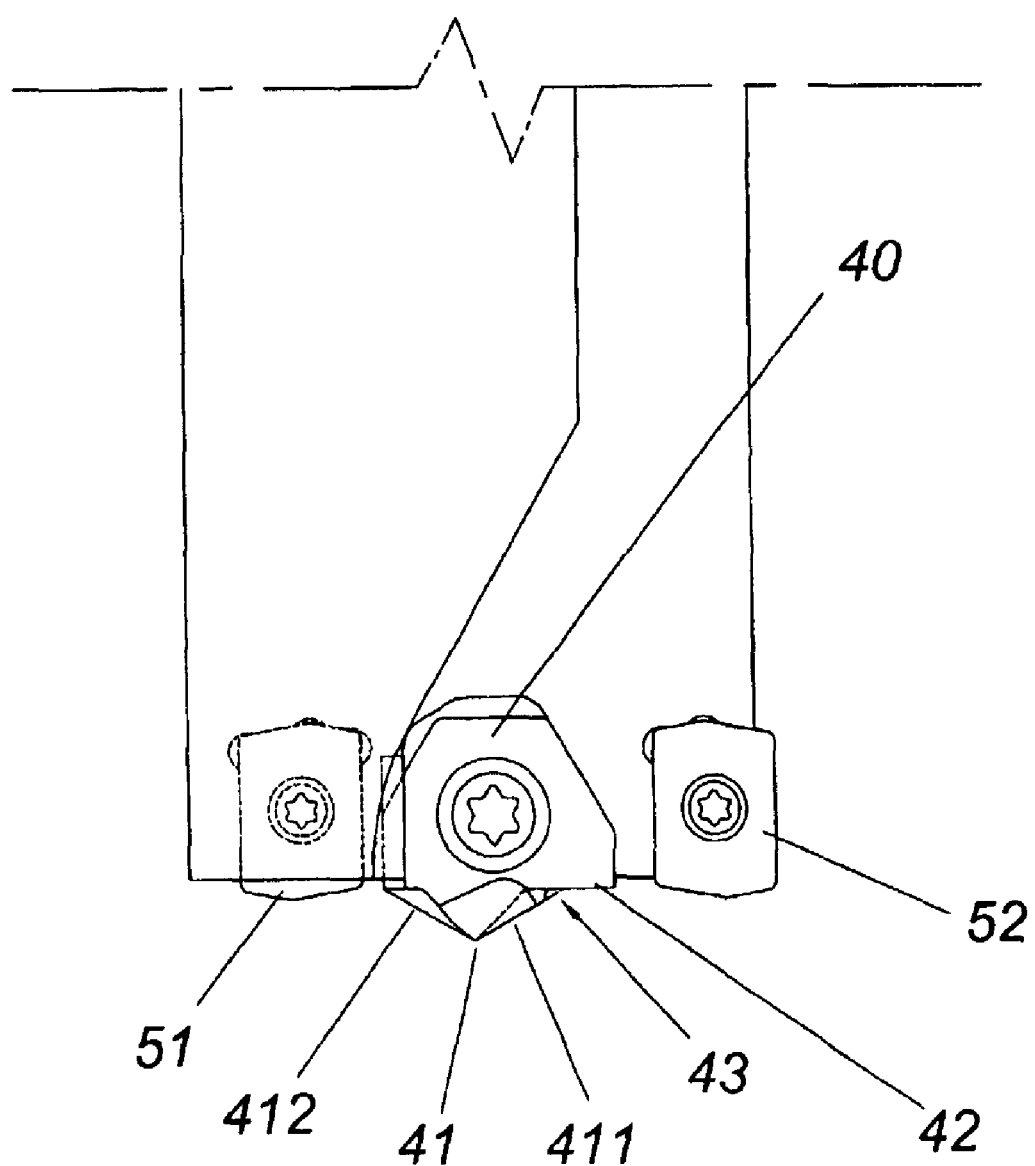
FIG. 3 is an enlarged part side view showing the tip head of the present invention.
Figure 4:
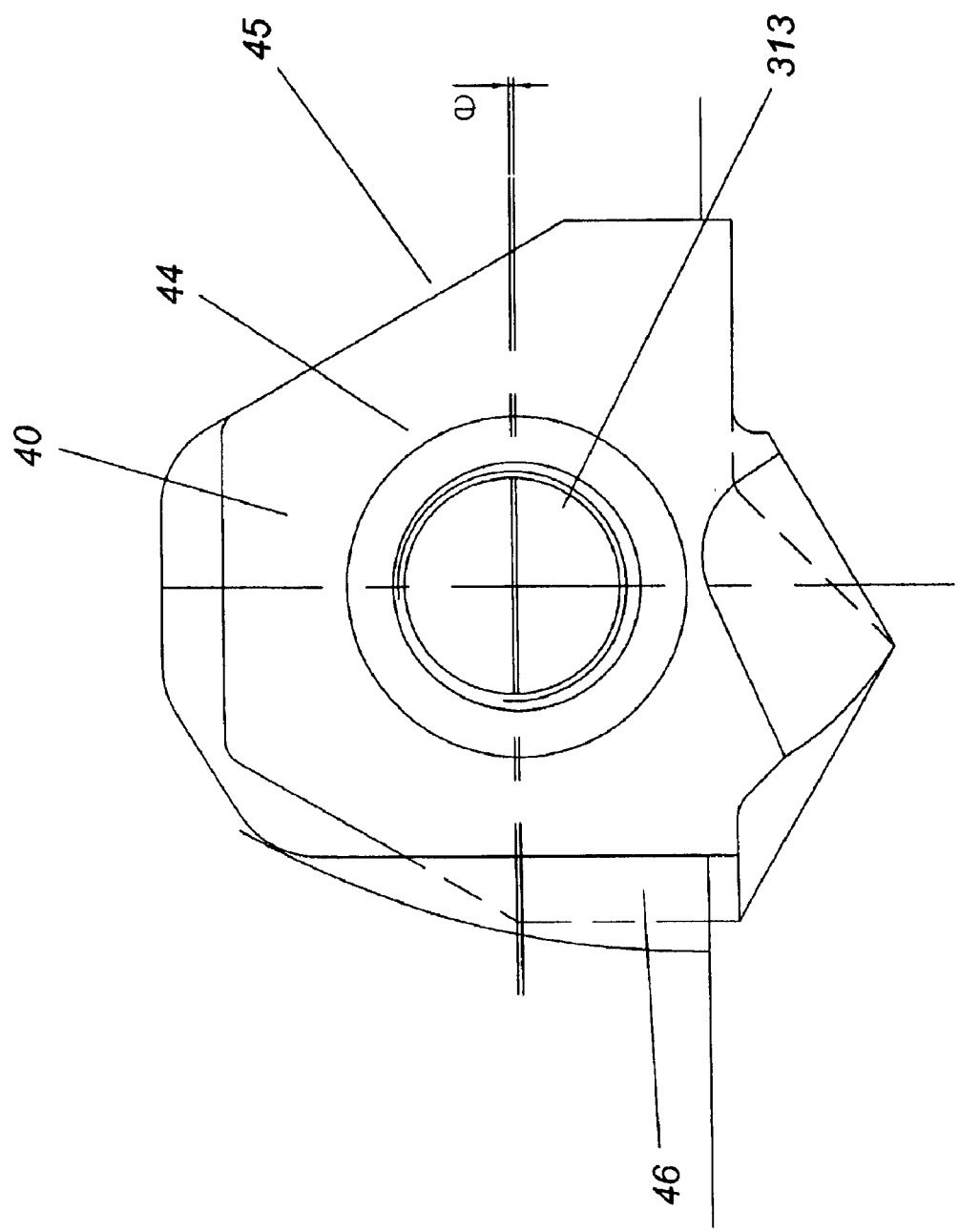
FIG. 4 is a side view showing the central cutting insert of the present invention.

Referring to FIG. 1 to FIG. 2, the present invention builds up a central cutting insert retainer 31 at the tip end of the bit shank 30 for securing and locating a central cutting insert 40, beside said retainer 31 at the both sides of it correspondently build up two cutting insert retainers 32 and 33 for securing an inside cutting insert 51 and an outside cutting insert 52; wherein:

The central cutting insert 40 has an integrated extended cutting edge 42 built up at one side of the central drill 41, and a notch 43 built on the joint portion of the side cutting edge 411 of the central drill 41 and said extended cutting edge 42 to form a discontinuous cutting, and this gap remained by the notch 43 is cut away by the another side cutting edge 412 of the central drill 41 in the next turn (as shown in FIG. 3), and a bevel side 45 approaching to the tip side on one side, and a slope 46 paralleling to the central axle and coordinating to the shape of the dovetail side of the central cutting insert 40, is built upon the other side as a single side of dovetail groove;

The central cutting insert retainer 31 of the bit shank 30 is a slot, therein a side is built as a single side of dovetail groove 311 with a slope, the opposite side is appeared to a bevel side 312 for coordinating to the central cutting insert 40, and also has a screw hole 313, as shown in FIG. 1 and FIG. 4, coordinating to the blind hole 44 of the central cutting insert 40, but the center point of the screw hole 313 has a little bit displace with the center point of the blind hole 44 of the central cutting insert 40 upward about 0.05 mm.

In accordance with above-mentioned features, the present invention has some progresses and structure features described in follows:

The integrated extended cutting edge of the central drill:

1. Eliminating build-up chip; referring to FIG. 2 and FIG. 3, the central cutting insert 40 has an integrated extended cutting edge 42 so that it not only has the central drill 41 drill and the locating central hole, but also includes a level cutting edge 42 working as an inside cutting edge having milling function, the main goal is to use the central drill 41 to create continuous cutting with the V-shaped both bevel cutting edges 411 412 so that the chip will not reside on the joint portion of the cutting edge 411 and the extended cutting edge 42, and the extended cutting edge 42 has an overlap portion with the inside cutting insert 51 so as to avoid the chip residing the gap between them to wear the cutting edges and generate extra cutting resistance, therefore every cutting edge is kept in sharp state without happening cutting edge broken, and helpful to drilling process and prolong the service life, reduce the frequency of replacing insert and the production cost.

2. Eliminating concentrated cutting stress: referring to FIG. 3, the notch 43, built upon the corner—the joint point of the bevel cutting edge 411 of the central drill 41 and the level extended cutting edge 42 in the central cutting insert 40, does not make cut, the maintained metal will be cut by the cutting edge 412 on the other side as turning to patch the notch (as the shown portion plotted by broken line) to create continuous cutting. Because the notch 43 positions on the joint point, and has not cutting function on it, so it eliminates the joint corner of said level extended cutting edge 42 and the bevel cutting edge 411 so as not to generate the concentrated cutting stress blocked by the notch 43, meanwhile not any cutting stress exerts on the notch 43 so as to guarantee the safety of the notch 43, as above-described, the cutting force on the notch 43 position is taken by the bevel cutting edge 412 in the next turn; therefore, we can get the conclusion wherein the notch 43 designed for completely eliminating the concentrated cutting stress so as to make the central cutting insert have better performance and cutting capability, and prolong the service life efficiently and improve relatively production capability.

Figure 5:
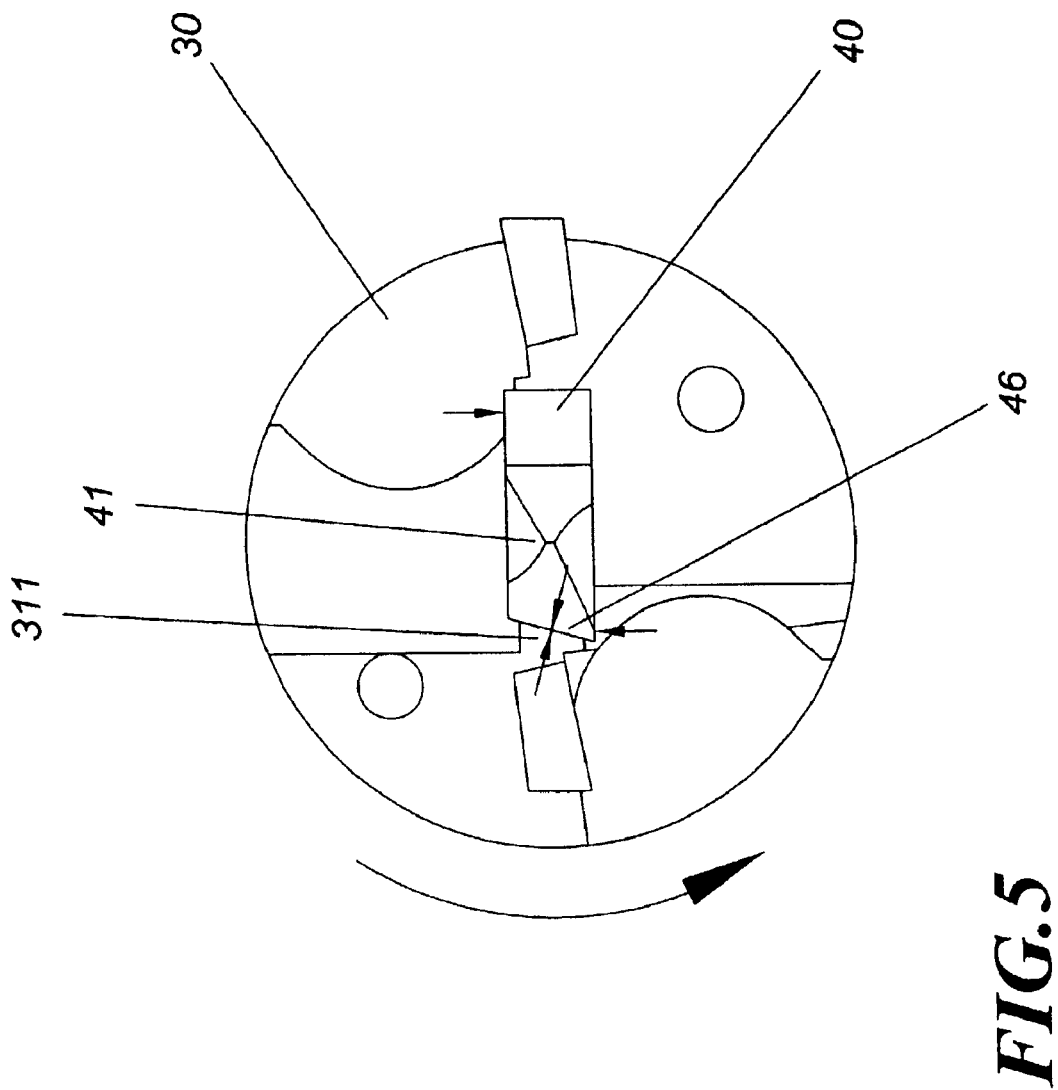
FIG. 5 is a top side view of the present invention.

3. High rigid structure design of the central cutting insert retainer: referring to FIG. 1, coordinating to the shape of the central cutting insert 40, the central cutting insert retainer 31 has a single side of dovetail groove 311 with a slope coordinating to the dovetail slope 46 of the central cutting insert 40, and the opposite side appeared to a bevel side 312 for inserting the central cutting insert 40 in, as shown in FIG. 5, when drilling, the cutting resistance exerts on the portions (fingered by arrows) of the central cutting insert 40, the slope 46 gets the purport from the single side of dovetail groove 311—a portion of the bit shank, so the dovetail groove 311 supplies so enough rigid that the central cutting insert 40 can stand up to the drill cutting resistance, avoiding the cutting resistance concentrating on the screw of fastening the central cutting insert 40, further to improve the rigidity of the central cutting insert 40 to stand up to high cutting resistance, and the cutting capability of the insert 40.

4. Better locking condition of the central cutting insert: the screwing hole 313 built on the central cutting insert retainer 31 of the bit shank 30, as shown in FIG. 1 and FIG. 4, coordinating to the center of the blind hole 44 of the central cutting insert 40, is to displace the center upward a bit e about 0.05 mm, by the side-play amount, the central cutting insert 40 may be tended to move upward a bit, as securing the central cutting insert 40 the head of the screw 47 may press the side wall of the blind hole 44, simultaneously push the central cutting insert 40 to move a bit upward, cooperating to the bevel side 312 and the slop 311, the central cutting insert 40 is retained tightly without any gap, such as integrating into one whole body without any consideration about securing stability of the screw, the rigidity of the central cutting insert 40 is guaranteed efficiently, meanwhile the practicality is much improved.

Figure 6:
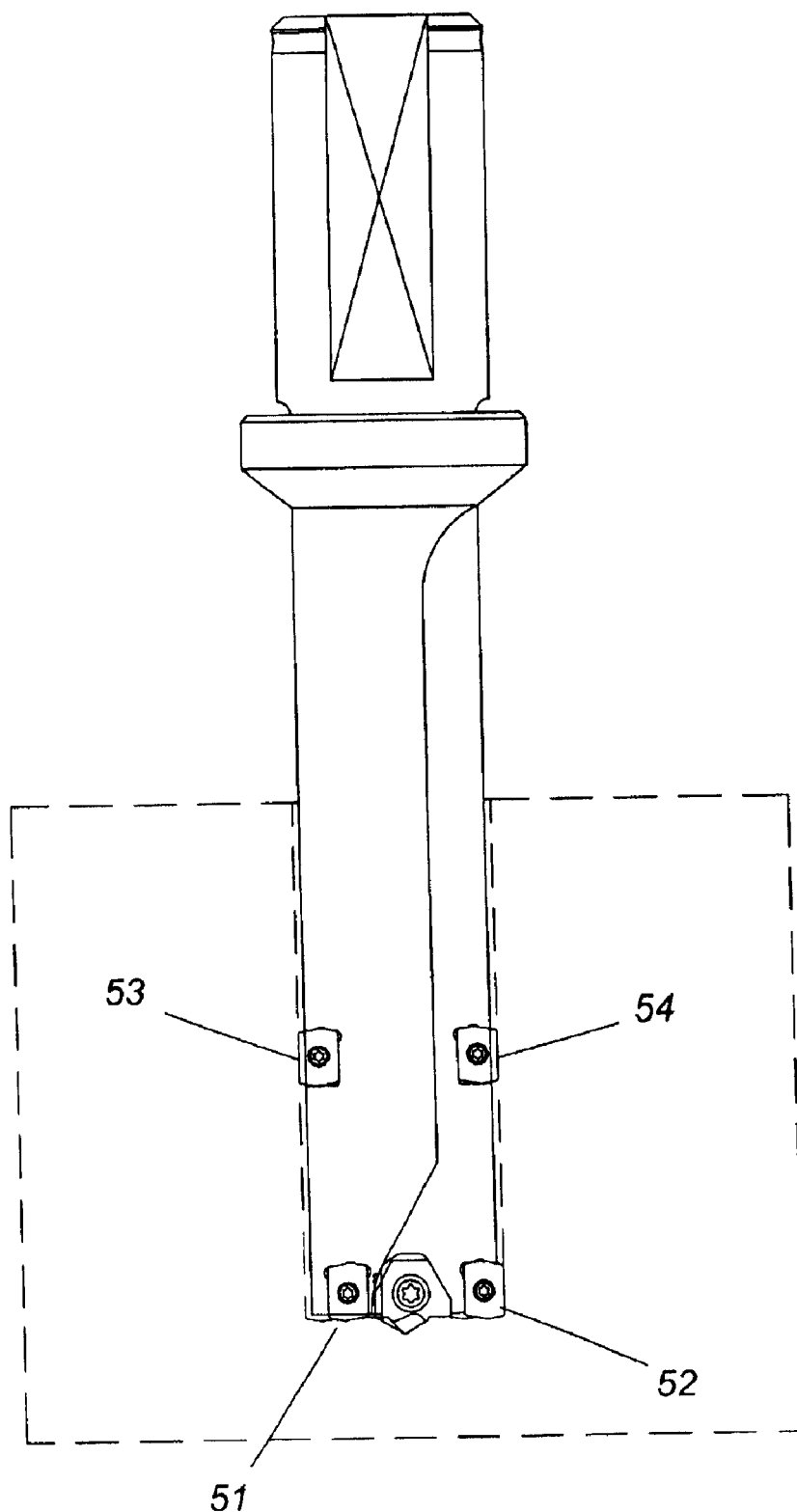
FIG. 6 is a scheme showing cooperating to a pair of side supporting inserts in the embodiment of present invention.

5. Cooperating to the supporting inserts to improve the rigidity of the bit shank: referring to FIG. 6, a pair of supporting inserts 53 and 54 are located on the proper positions above the inside and outside cutting inserts 51 and 52, and have a same cutting size as the outside cutting insert 52 (as milling cutting the diameter size of the hole), so when drilling a hole with the bit, the central cutting insert 40 and the inside cutting insert 51 and the outside cutting insert 52 take part in drilling process, and the supporting inserts 53 and 54 contact against the drilled side wall of the hole to generate support torque on the bit shank for improving the rigidity of the bit shank so as to drill deep hole, hence the application of the present invention is widened in drilling deep hole.

Figure 7:
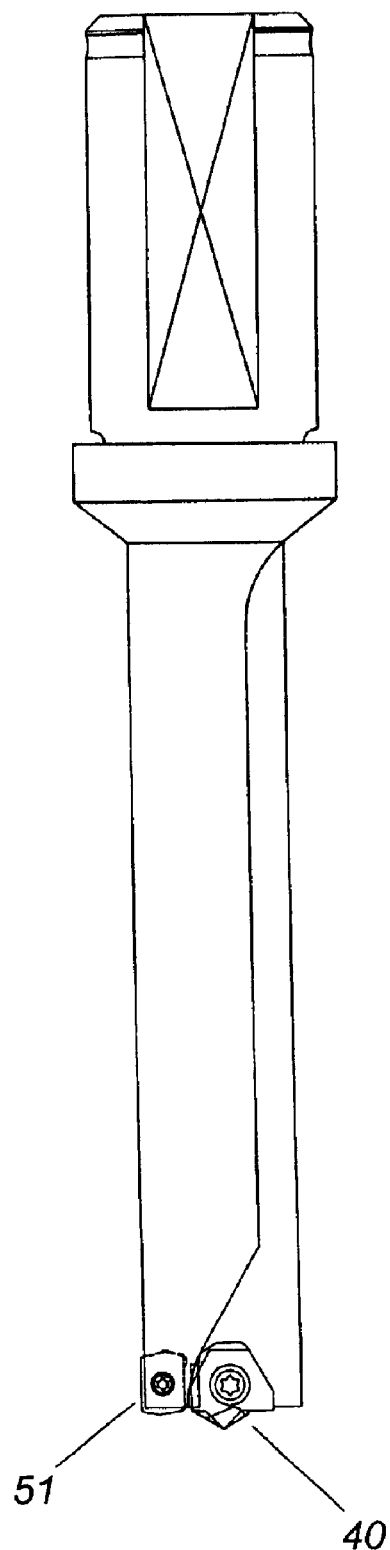
FIG. 7 is a side view showing drilling a smaller diameter hole in the embodiment of the present invention.
Figure 8:
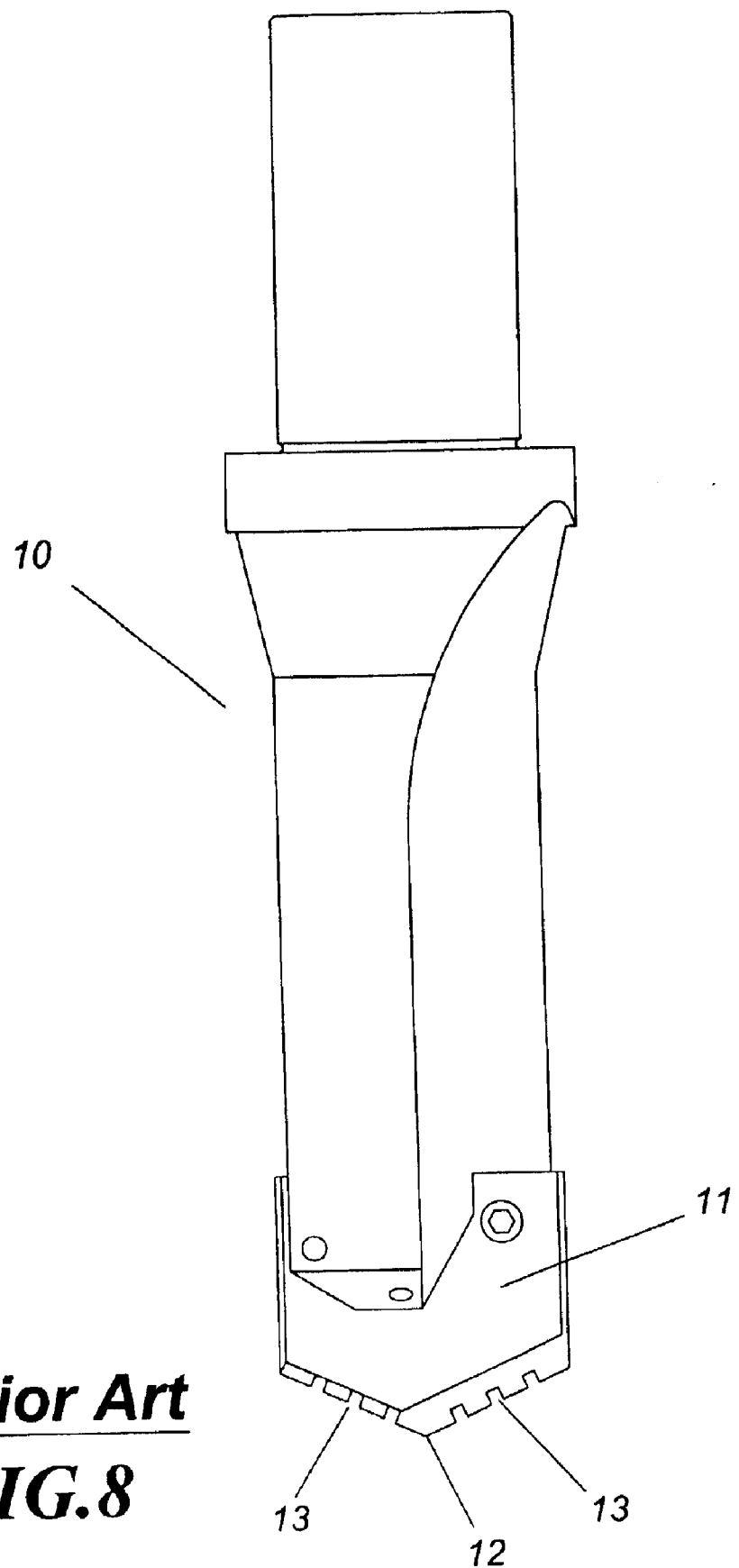
FIG. 8 is a side view of a conventional flat inserted drill.
Figure 9:
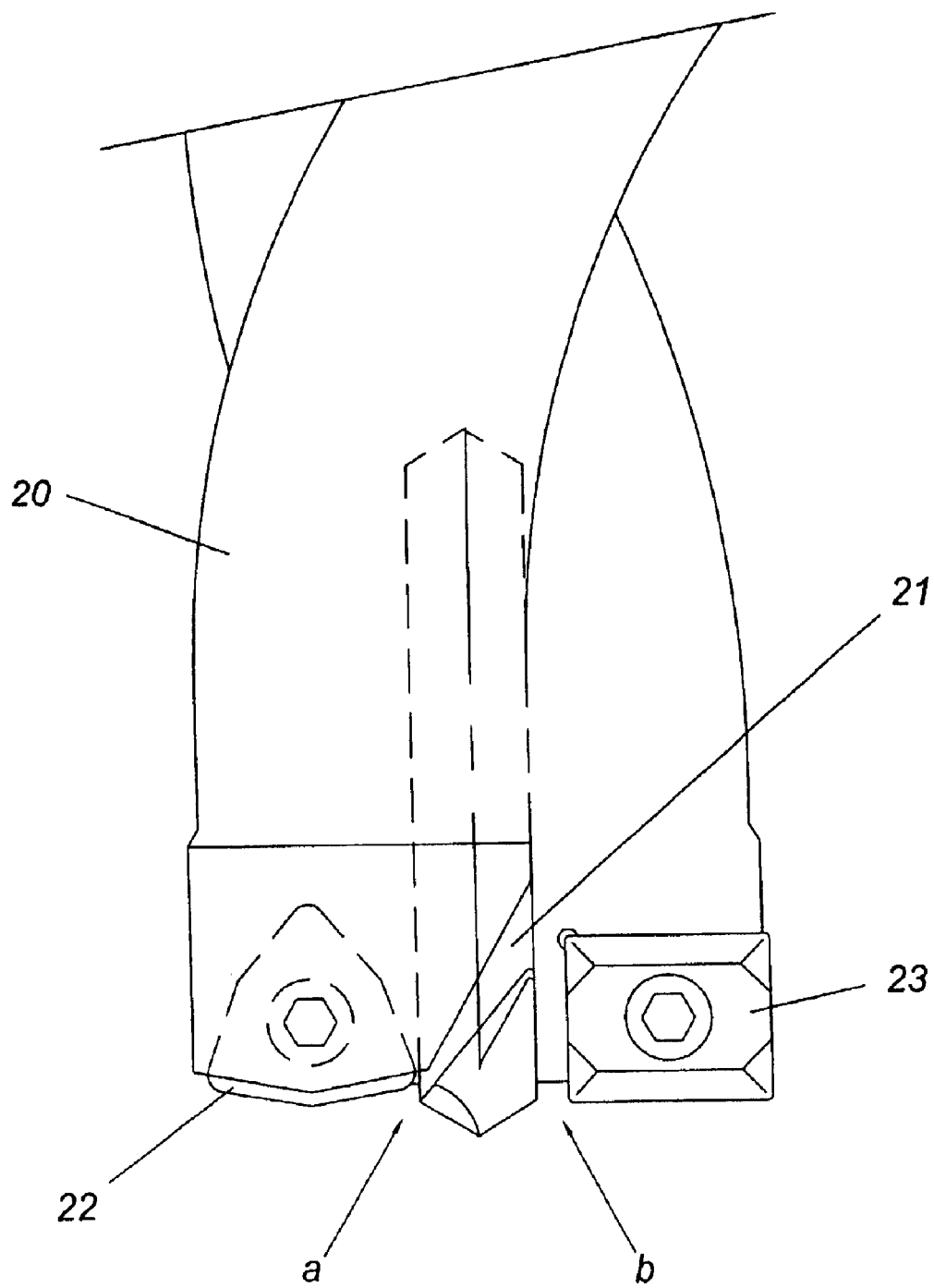
FIG. 9 is a part side view of a conventional replaceable drill bit.

6. Variable size of the bit: following the change of the bit size, the bit structure of the present invention may be changed too, therefore the inside and outside cutting inserts 51 and 52 are selected to attach on the bit shank depending on the size of the bit, if the size is smaller, just attaching the inside cutting insert 51 is enough, as shown in FIG. 7, if to the bigger size, the inside and outside cutting inserts 51 and 52 should be attached all, therefore the present invention covers the small to big sized drill bits by freely attaching inside and outside cutting inserts.

In accordance with above-described features of the structure design of the central cutting insert and the bit shank, the present invention has following progresses and advantages:

1. Integrating the central cutting drill and the level extended cutting edge into one whole body is a vital feature of the present invention, thereby preventing chip from building up on the cutting edges and the cutting edges from breaking up, further to improve cutting efficiency and performance.

2. Building up a notch without cutting function on the joint portion of the bevel cutting edge of the central cutting drill and the level extended cutting edge separates said two cutting edges segments so that the cutting resistance may not be concentrated on the notch, and efficiently avoid the cutting edges being broken up, the service life of the cutting inserts is prolonged.

3. The single side of dovetail groove design of the central cutting insert retainer efficiently improves the rigidity of the central cutting insert, and facilitates the central cutting insert embedded in, and replaced, further to improve the rigidity of the central cutting insert, and cutting capability.

4. A little off-set between the center of the screw hole of the bit shank and the blind hole of the central cutting insert is tending to push the central cutting insert upward as securing, cooperating to the central cutting insert retainer, to lock the central cutting insert completely.

5. Attaching the supporting inserts on the bit shank widens the application field of the present invention to drill deep hole.

6. According to the size of the drill bit, the present invention can be freely combined with inside and outside cutting inserts.

I claim:

1. A unitized replaceable drill bit, wherein the bit shank has a central cutting insert retainer built up on the tip end for embedding a central cutting insert, beside the central cutting insert, at the both sides of it correspondently build up two cutting insert retainers for securing an inside cutting insert and an outside cutting insert; said central cutting insert has a level extended cutting edge integrally built on one side of the bevel cutting edge of the central cutting drill.

2. A unitized replaceable drill bit as claimed in claim 1, wherein a notch is built upon the joint point of the bevel cutting edge of the central cutting drill and the level extended cutting edge to separate the two cutting segment edges, the maintained portion of the notch is cut by the another side bevel cutting edge of the central cutting drill in next turn.

3. A unitized replaceable drill bit as claimed in claim 1, wherein said central cutting insert has a bevel side approaching to the tip side on one side, and a slope paralleling to the central axis and coordinating to the shape of the dovetail side of the central cutting insert, is built upon the other side as a single side of dovetail groove.

4. A unitized replaceable drill bit as claimed in claim 1, wherein the central cutting insert retainer has a screw hole, coordinating to the blind hole of the central cutting insert, but the center of the screw hole has a little off-set upward relative to the center of the blind hole of the central cutting insert.

* * * * *